May 20, 1924. 1,494,497
O MAY
APPARATUS FOR AND METHOD OF EXTERMINATING GARDEN PESTS AND FOR IRRIGATING
Filed May 16, 1922
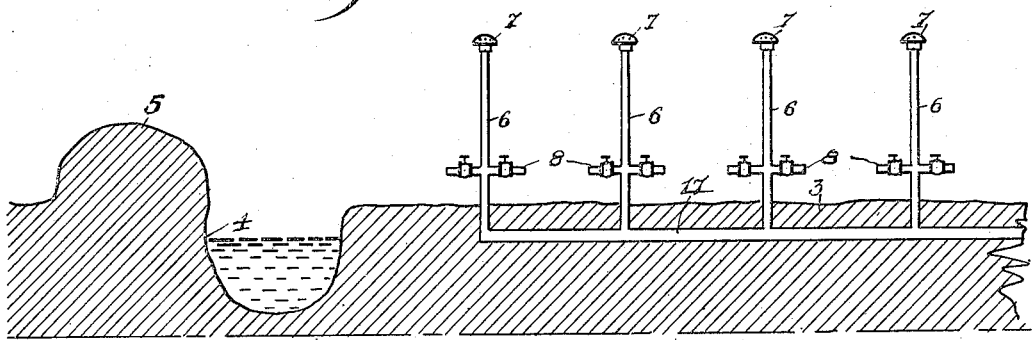
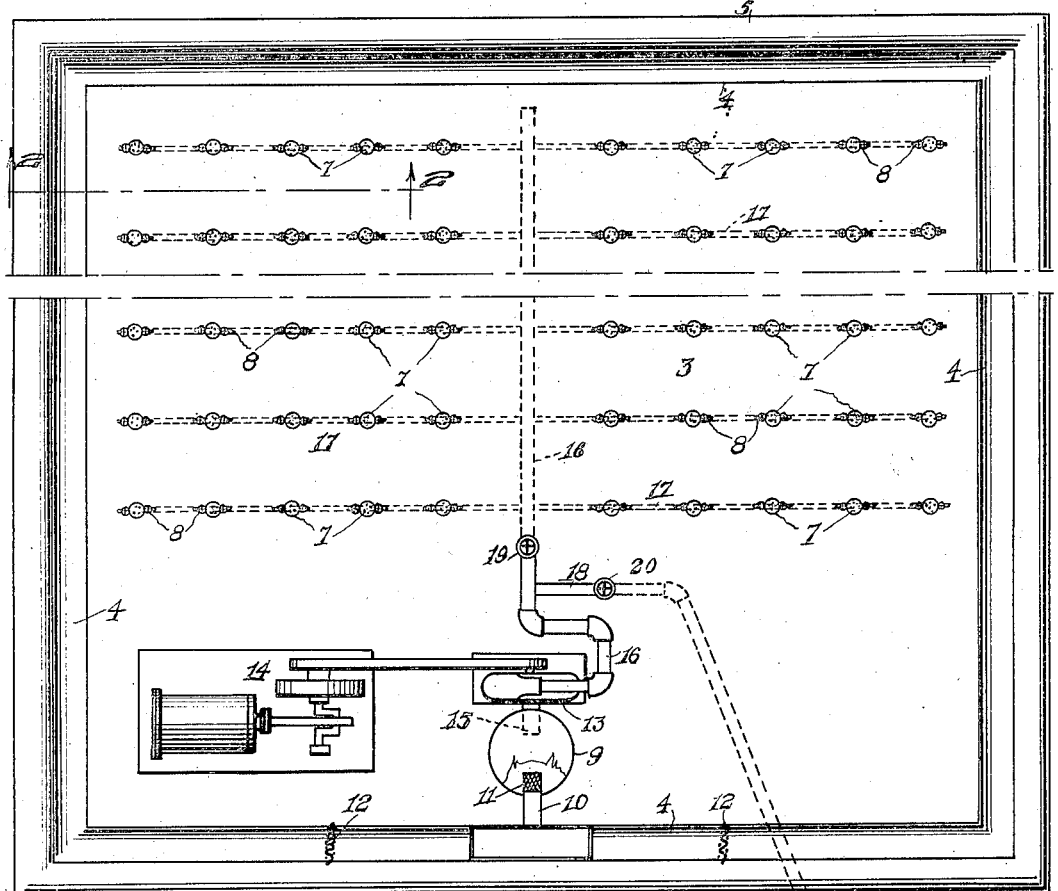

Patented May 20, 1924.

1,494,497

UNITED STATES PATENT OFFICE.

O MAY, OF PUNTA GORDA, FLORIDA.

APPARATUS FOR AND METHOD OF EXTERMINATING GARDEN PESTS AND FOR IRRIGATING.

Application filed May 16, 1922. Serial No. 561,547.

*To all whom it may concern:*

Be it known that I, O MAY, a citizen of the United States, residing at Punta Gorda, in the county of Charlotte and State of Florida, have invented certain new and useful Improvements in Apparatus for and Methods of Exterminating Garden Pests and for Irrigating, of which the following is a specification.

In tropical and semi-tropical country, very great damage to vegetation is done by certain insects and worms which because of their subterranean methods of life have proven very difficult to overcome and practically impossible to exterminate. Among these, probably the most destructive, is that of the family of Nematoidea, commonly designated in Florida as "eel-worms," and that insect of the genus Grylotalpa, well-known as "mole-cricket."

The primary object of the present invention is to provide an apparatus for and a method of exterminating such harmful insects from determined areas or plots forming gardens, orchards and the like, thereby freeing such areas or plots from the pests and also providing a bar to their incursions from outside.

A further and important object is to so construct the apparatus that it may be employed for effectively irrigating the protected area in dry weather and for eliminating surplus moisture in times of superabundance thereof.

Incidentally a third object is to make the apparatus utilizable as a means for protecting the vegetation of the area from damage due to cold winds or light frosts.

In the accompanying drawings:—

Figure 1 is a plan view somewhat diagrammatic in its character of one embodiment of the invention for carrying out the novel method.

Figure 2 is a vertical sectional view on the line 2—2 of Figure 1 and on an enlarged scale.

In the embodiment illustrated, a garden, orchard or other vegetation-containing area 3 is surrounded by a water-receiving trench 4, which in turn is enclosed by an embankment or dyke 5. The material from the trench may be utilized as a part or as the whole of the said embankment or dyke 5.

Arranged at intervals over the area 3 are stand pipes 6 terminating at their upper ends in spray nozzles 7 and preferably having above the surface of the ground valve-controlled outlets 8. A well 9 is preferably located within the area and the outlet from the trench 4 leads to this well. This communication can be cut off at any time, for example, by damming the trench on opposite sides of the well. This outlet may be in the form of a pipe 10 having a screened delivery end 11. Preferably also screens 12 are placed across the trench on opposite sides of the outlet 10.

A pump 13, driven by any suitable power unit, as for example an internal combustion engine 14, has its intake 15 in the well 9 and from this outlet a pipe 16 leads to branches or laterals 17 that are connected to the various stand pipes 6. An outlet pipe 18 is connected to the pipe 16 and has its discharge end outside the embankment 5. In said pipes 16 and 18 beyond their connections are controlling valves 19 and 20.

Assuming, for example, an orchard or garden plot in certain well-known districts of Florida provided with the above-described apparatus, the level of the subterranean water is ordinarily but a few feet below the surface and the above insects and worms live and work above that level. During the rainy season there is sufficient water available to flood the area and this is accomplished by opening the outlets 8 and operating the pump 13. The dyke not only keeps this flood water confined, but prevents outside surface water flowing thereinto. The worms will quickly drown but experience has demonstrated that the mole-crickets will swim upon the surface and keep alive for an extended period. If they are subjected to kerosene or similar oil they will quickly succumb. In practice therefore a line or strip of oil is poured upon the surface of the water along the windward side and this strip will pass across the surface under the influence of the wind, killing the floating insects and eventually reaching the opposite bank and trench.

After such treatment the valve 19 is closed, the valve 20 opened and the pump is put into operation. As a consequence the flood water with the surface oil is removed and discharged outside the area, and the land is now in condition to plant. Water, however, is preferably retained in the trench and constitutes a bar to incursions of the worms and insects from outside the treated area.

Should an excessive rain fall afterwards occur, obviously the surplus within the dyke may be pumped outside and said dyke prevents the inflow of water over the surface into the plot.

In times of drought, the apparatus may be used for irrigating purposes, in which case the water is withdrawn from the well by the pump 13 and sprayed over the area from the nozzles 7. The same treatment may be employed in case of cold winds or when there is danger of light frosts, for the water withdrawn from the relatively warm earth will modify the temperature in the immediate vicinity while the body of spray tends to act as a screen and deflect the air currents away from the surface and vegetation beneath.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In a system of the character set forth, the combination with a vegetation-containing plat, of a dyke completely enclosing the same to confine water therein and prevent its ingress from the exterior, a well for receiving water from the enclosed area, and means for pumping water from the well upon the area to flood the same and for pumping the flood water from the area to a point outside the dyke.

2. In a system of the character set forth, the combination with a vegetation-containing plat, of a dyke enclosing the same to confine water therein and prevent its ingress from the exterior, a water-receiving trench surrounding the area inside the dyke, and means for flooding the area and removing the flood water therefrom.

3. In a system of the character set forth, the combination with a vegetation-containing plat, of a dyke completely enclosing the same to confine water therein and prevent its ingress from the exterior, a well for receiving water from the enclosed area a water-receiving trench extending along the inner side of the dyke and having discharge communication with the well, and means for pumping water from the well upon the area to flood the same and for pumping the flood water from the area to a point outside the dyke.

4. In a system of the character set forth, the combination with a vegetation-containing area, a trench surrounding the same, and an enclosing dyke surrounding the trench, a well with which the trench communicates, a plurality of liquid delivering nozzles at intervals over the area, a pump having an intake in the well, an outlet conduit from the pump connected to the nozzles, a discharge conduit from the pump leading outside the embankment, and means controlling said conduits.

5. In a system of the character set forth, the combination with a vegetation containing area, of a water excluding dyke surrounding the same, a water-receiving trench about the area and at the inner side of the dike, a well receiving the water from the trench, sprayers distributed over the area, and a pump for delivering the water from the well to the sprayers, said area returning water so delivered to the trench.

In testimony whereof, I affix my signature.

O MAY.